Feb. 6, 1951 M. V. LONG 2,540,589
MAGNETIC TESTING RECORDING SYSTEM FOR METALLIC BODIES
Filed July 3, 1950 2 Sheets-Sheet 1

Inventor
Marion V. Long
By
his Attorney

Patented Feb. 6, 1951

2,540,589

UNITED STATES PATENT OFFICE 2,540,589

MAGNETIC TESTING RECORDING SYSTEM FOR METALLIC BODIES

Marion V. Long, Berkeley, Calif., assignor to Shell Development Company, San Francisco, Calif., a corporation of Delaware Application July 3, 1950, Serial No. 171,851

6 Claims. (Cl. 346—33)

The present invention relates to a method and apparatus for detecting flaws and defects in materials capable of conducting electric current, and relates more specifically to an indicating and recording system for magnetically testing metallic bodies such as rails, structural steel members, plates, and particularly metallic tubular elements such, for example, as boiler and condenser tubes. This application is a continuation-in-part of my application Serial No. 692,485, filed August 23, 1946, now abandoned.

Systematic and periodic inspection of metallic equipment members in industrial installations is essential from the standpoint of safety and economy of operations. Likewise, in the production of metallic equipment, it is important to check the thickness of the parts produced for uniformity of cross-section.

In applying magnetic testing methods, it is generally desirable to effect the testing at the fastest possible rate, so as to keep to a minimum the time during which the equipment under test remains idle. It is also often desirable to obtain permanent records of the tests made, for example, for purposes of comparison of the severity of conditions and of corrosion or pitting rates encountered in different parts of an installation.

It is therefore an object of this invention to provide a magnetic testing system of improved accuracy and sensitivity, whereby metallic members may be tested for flaws or defects, and the latter recorded in a reproducible manner on charts susceptible of correlation with the members under test for the purpose of an accurate location of said flaws and defects.

It is also an object of this invention to provide a magnetic testing system comprising an indicator and a recorder, said indicator being used to discriminate at a relatively high speed between sound and weakened, that is, pitted or corroded metallic members, or between members having a different wall thickness, and said recorder being used to produce a permanent and reproducible record of the test being made.

These and other objects of the present invention will be understood from the following description, taken with reference to the attached drawings, wherein.

For brevity and clearness, this invention will be described with regard to an embodiment of a magnetic testing system wherein the testing is effected by means of axially spaced probe coils insertable into the tubular member under test, for which purpose the present invention is especially well suited. It is however understood that this invention may likewise be used in magnetic testing systems involving other types of testing or probing elements, such as coils positioned around the element under test, or coils positioned adjacent to said element and movable with regard thereto, the present invention being therefore not limited by said description, but only by the scope of the claims appended hereto.

Figure 1:
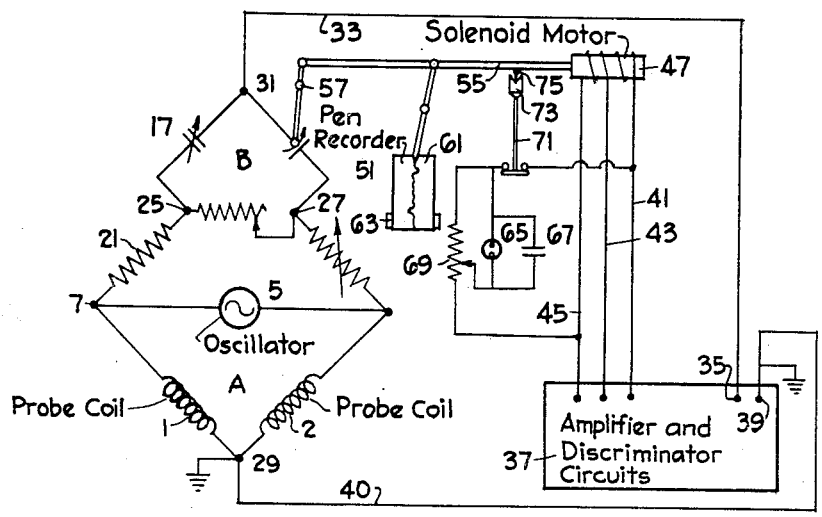
Fig. 1 is a schematic connection diagram of the system of the present invention.

Referring to Fig. 1, the present magnetic testing system comprises a variable frequency power supply source 5, such for examply as an electronic oscillator, and preferably a variable frequency audio oscillator having a frequency range from about 100 to about 20,000 cycles per second and an available power output of about three watts.

This wide range of available frequencies is desirable in order that the present system may be applied with optimum efficiency to the testing of metallic elements made of different materials.

Although metallic elements made of non-magnetic metals or alloys may be often tested at the same frequencies as those made of magnetic materials, it has been found that in some cases best results may be obtained by using certain frequencies for certain particular materials. For example, in testing condenser tubes made of admiralty metal a non-magnetic alloy, a very effective frequency range has been found to be about 1000–2000 cycles per second.

The output terminals of the power supply source are connected at 7 and 9 to a measuring bridge circuit whose impedance preferably matches the output impedance of the supply source.

The measuring bridge circuit is a compound or double bridge of a type comprising a main bridge A and an auxiliary bridge B. The probe coils 1 and 2, to be described hereinbelow, are respectively connected into two arms of the main bridge A. The other two arms of bridge A are formed by variable impedance or resistance means shown by elements 21, 23 and 11, one of said arms comprising, for example, resistance 21 and an adjacent portion of the intermediate resistance 23, and the other arm comprising resistance 11 and an adjacent portion of the resistance 23. The apparent or effective division of resistance 23 between said two arms is at that point on resistance 23 which has the same potential as point 29 intermediate the two coils 1 and 2. The two portions into which the resistor 23 is thus divided form also two arms of the auxiliary bridge B. Impedance or reactance means such for example as a condenser 17, which may be variable, and a variable condenser 15, having a movable, automatically adjustable plate or plates, form the other two arms of the auxiliary bridge B being connected across the resistance 23 at points 25 and 27.

It may be considered that any condition of unbalance between coils 1 and 2 will result in a shift of the balance or division point on resistance 23. This will produce an unbalance potential at point 31 with respect to point 29. This unbalance potential is amplified and used to readjust condenser 15 to balance bridge B as will be described more fully hereinbelow. This readjustment of balance in bridge B is accomplished by adjusting condenser 15 in such a direction as to make the ratio of condenser 15 and 17, forming two arms of the bridge B, equal to the ratio of the corresponding adjacent sections of resistor 23, forming the other two arms of bridge B.

Resistor 23 is made variable in order to adjust the sensitivity of the system for a given unbalance between coils 1 and 2. For a given unbalance it can be seen that the balance point on resistor 23 will move a small percentage of the total value of resistor 23 when 23 is relatively large and a large percentage of the total value when 23 is relatively small. This will require condenser 15 to change its value a correspondingly small or large amount in order to rebalance bridge B. It is evident that the variable condensers shown in the bridge circuit being used as means for vectorially balancing the bridge against impedance changes, variable inductances can be substituted therefor to achieve the same purpose, condensers being however preferred because of the ease with which their settings can be adjusted and varied.

The measuring bridge circuit is connected, at points 31 and 29, to the input terminals 35 and 39 of a unit 37 comprising the desired electronic circuits, such for example, as pre-amplifier, discriminator and amplifier circuits. Points 29 and 39 should preferably be grounded.

The output of the unit 37 is connected by leads 41, 43 and 45, to a reversible motor, which may be of the solenoid type as shown at 47, serving as a prime-mover actuating the movable plate or plates of condenser 15 and the pen 53 of a pen recorder system generally shown at 51.

As an illustration, the operation of the solenoid motor reciprocates a stem 55 which causes the desired displacement of the movable plates of the variable, automatically adjustable condenser 15 and at the same time of a pen 53 synchronized therewith through suitable mechanical linkages pivoted for example, at 57 and 59 respectively.

The chart 61 of the pen-recorder 51 may be actuated by any desired electrical or clock-work mechanism comprising a roller 63 on which said chart is wound, the motion of this chart being synchronized with the motion of the probe element with regard to the member under test, as will appear hereinbelow.

Connected across the solenoid motor 47 between leads 41 and 45 is the circuit of a flash indicator, comprising for example a resistance 69 connected across leads 41 and 45 and a glow discharge or neon tube 65, connected across a desired variable portion of said resistance. The glow discharge tube may have a condenser 67 connected in parallel therewith.

The circuit of the tube 65 may likewise be provided with a switch 71, arranged to close said circuit while at the same time locking the recorder system in a fixed position, which may be effected, for example, by engaging a pin member 75 on the stem 55 with a lock member 73, forming part of the switch 71.

Figure 2:
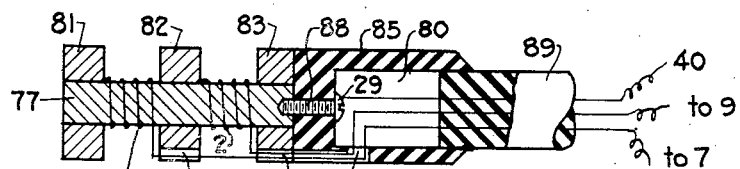
Fig. 2 is a diagrammatic view, partly in cross-section, of the probe element of the present system.

The arrangement of coils 1 and 2, connected to form two of the arms of the measuring bridge, is shown in Fig. 2.

Coils 1 and 2 are mounted on a probe element having a core comprising a central mandrel member 77 provided with flange members 81, 82, and 83 forming a single magnetic structure therewith. The mandrel and flange members are made of a suitably selected magnetic material, and may be laminated if desired. The mandrel and the flanges may be of circular, square, octagonal or any other desired cross-section.

The coils 1 and 2 are wound co-axially and longitudinally of each other around the mandrel 77 between the flanges 81, 82 and 83, and may each comprise a desired number of turns, such as from 800 to 5000, of an insulated wire.

One end of the core structure may be held in screw-threaded or other suitable engagement as shown at 88, with a handle 85, which may be made of a suitable insulating material such as hard rubber or a plastic and has substantially the same outside diameter as the flanges 81—83, for example $\frac{3}{8}$, $\frac{1}{2}$, $\frac{5}{8}$, 1'', etc., depending on the size of the tubular elements to be tested.

The handle 85 is connected to the end of a long flexible cable 89, made of rubber or other insulating material, and containing a suitable number of electrical conductors.

One of the ends of each of the coils 1 and 2 is soldered or otherwise connected to the mandrel 77, which is in turn electrically connected at 29 to the conductor 40 in the cable. The other ends of coils 1 and 2 are let, through holes or slots such as 82A and 83A in the flanges, and slot 85A in the handle, to a space 80 within the handle, where they are electrically connected to corresponding conductors in the cable bringing them respectively to points 7 and 9 of the diagram of Fig. 1.

Figures 3, 4:
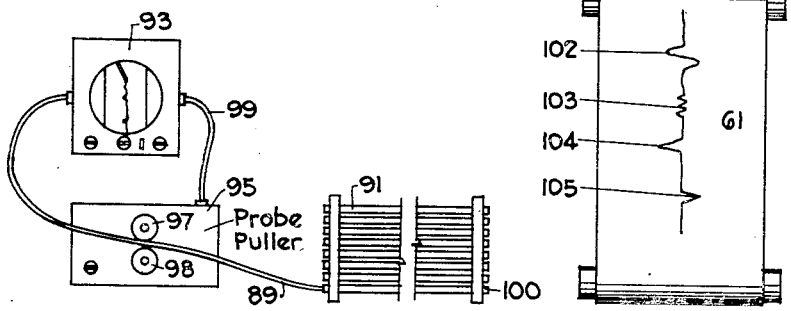
Fig. 3 is a general view of the present system installed for testing.
Fig. 4 is a chart record such as produced by the present system.

In operation, the present system, as shown in Fig. 3 is installed adjacent the material to be tested, for example, a bundle of condenser tubes 91, all the elements of the system of Fig. 1, except coils 1 and 2, being enclosed in a housing 93.

The probe element with the coils 1 and 2 is inserted, at the end of the flexible conductor cable 89, into one of the tubes of the bundle 91, preferably until it reaches the far end 100 thereof.

It will be seen that when a high frequency current is delivered to the coils 1 and 2, the flanges 81, 82 and 83 of the probe element serve to provide high permeability paths for the magnetic flux produced by the flow of current through the coils, said magnetic flux passing through the walls of the tubular element into which the probe is inserted, and inducing therein eddy currents which react back on the coils 1 and 2, thus modifying the impedance of said coils to the current passing therethrough.

When the probe element has been inserted into the tube under test and the oscillator 5 started, the measuring bridge circuit of Fig. 1 is adjusted to a vectorially balanced condition by proper manipulation of the variable resistance 11, and a proper selection or adjustment of the condenser 17. This adjustment is effected so as to leave the movable plate of the variable condenser 15, mechanically linked to the recorder pen system, in a position wherein said condenser is approximately at a mid-point of its range and the recording pen 53 bears approximately against the center or reference line of the chart 61, for example, at a point 101, as shown in Fig. 4.

The conductor cable 89 is, if desired, passed over the driving wheels 97 and 98 of a probe-puller unit 95, actuated by a motor which may be synchronized with the driving mechanism of the chart 61 through an electrical connection 99.

As the probe unit is moved by the probe-puller 95 through the tube under test at a uniform rate synchronized with the motion of the chart, the recording pen traces on said chart a line which reflects the condition of the measuring bridge circuit.

So long as the probe element is moved through sound portions of the tube under test, that is, portions having a substantially uniform wall thickness, free from flaws, cracks, pits, or other defects, the magnetic field surrounding coils 1 and 2 is likewise substantially uniform and not subject to any distortion or disturbance. When, however, the probe element passes into a tube portion having a defect or any type of variation or irregularity in the cross-section of its wall, the resulting magnetic field disturbance reacts on the probing coils and causes the measuring bridge to become unbalanced.

A potential appearing across points 29 and 31 of the now unbalanced measuring bridge is transmitted to the electronic amplifier and discriminator or selector circuits of the unit 37. These standard circuits, which form no part of this invention, and are therefore shown only in form of a block diagram, serve merely to amplify these voltage pulses and to apply them selectively through leads 41 and 43, or 43 and 45, depending on their polarity, to the solenoid motor 47, causing said motor to move the rod 55 axially in one or the other direction, thereby actuating the movable plates of the variable condenser 15 in such a manner as to restore the balance of the measuring bridge. The motion of the rod 55, through which the action of the solenoid motor is applied to the condenser, results also in the displacement of the pen 53, which is synchronized or mechanically linked therewith, causing said pen to record the re-balancing action of the circuit and thus the presence of a flaw in the tube, as shown at 102 in Fig. 4.

Figure 5:
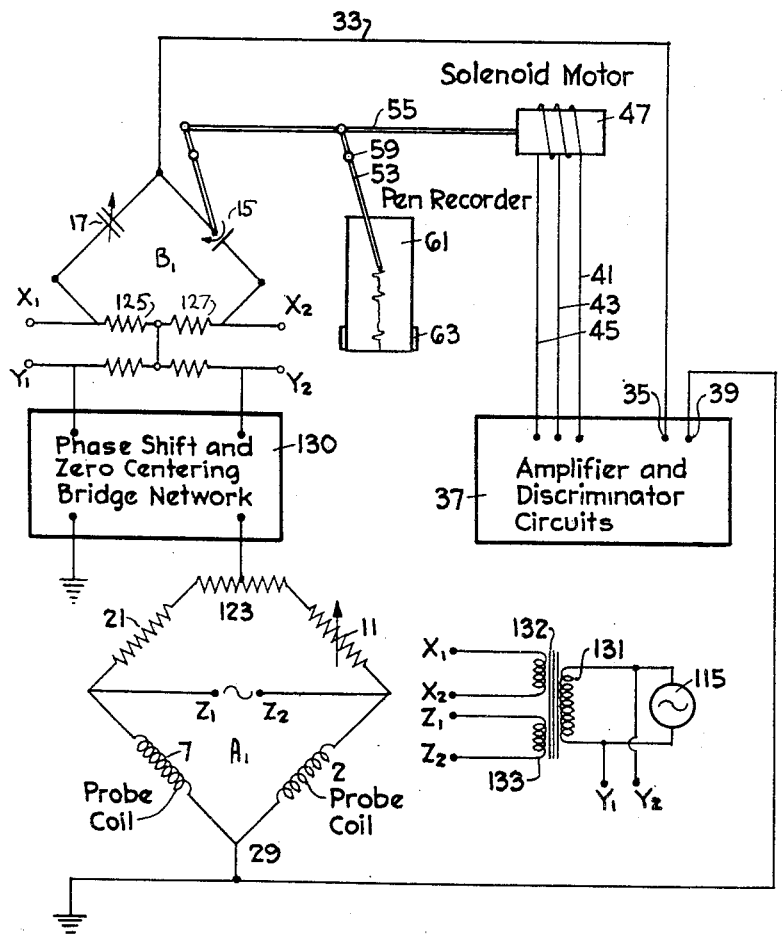
Fig. 5 is a schematic diagram of another embodiment of the present system.

A slightly modified embodiment of the present system is shown in Fig. 5, wherein identical or corresponding elements are denoted by the same numerals. The compound measuring circuit of Fig. 5, like the one of Fig. 1, consists of a main bridge $A_1$ and an auxiliary bridge network $B_1$ having parallel branches comprising impedances formed of condensers 15 and 17 and resistances 125 and 127, and connected to an intermediate portion of the resistance 123 of the main bridge $A_1$ through a suitable phase-shift and zero-centering bridge network 130, which provides, in a manner well understood by those familiar with the art, for a ready adjustment of the phase angle and of the recorder pen 53 to any selected zero-line on the chart 61. The compound measuring circuit is energized from an oscillator 115 through a transformer having a primary 131 and secondaries 132 and 133, connection terminals being indicated at X, $X_2$, Y and $Y_2$, and Z and $Z_2$.

The neon lamp 65 and its circuit is omitted in the system of Fig. 5, as it is understood it may likewise be omitted in that of Fig. 1.

The system of Fig. 5 operates in a manner identical with that of Fig. 1, the automatic rebalancing of the circuit by means of the condenser 15 being responsive to unbalance voltages appearing across points 29 and 31.

The amplitude of the deviation of the pen 53 from the reference line indicates the severity of the defect in the tube. Thus, even relatively small defects, such for example as caused by dezincification, can be accurately charted by the present instrument, as shown at 103. Likewise, when a probe passes through a portion of a tube wherein walls have been thinned, due to corrosion or other reasons, the beginning and the end of such thinned portion is indicated by deflections such as shown at 104 and 105 respectively, said deflections being in opposite directions since the coil 2 is first to enter and also first to leave such thinned portion.

If a large number of relatively long tubes or tube bundles is to be tested by means of the present system, the operations may be considerably speeded by the use of the indicator means comprising the neon tube 65, which permits to differentiate rapidly between sound and defective tubes, whereupon only defective tubes need be subjected to testing involving the step of recording.

For this purpose, the switch 71 may be manipulated to close the circuit of the flow tube 65, at the same time locking the rod 55. The probe is thereupon pulled through the tube in the usual manner, but at a much higher speed, which is possible since the measuring bridge system does not have to rebalance itself after each field disturbance, the movable plate of condenser 15 and the pen 53 being locked in a fixed position. Under these conditions whenever the probe encounters a flaw in the tube and the bridge becomes unbalanced, the voltage pulse due to this unbalanced condition is transmitted, upon amplification in the unit 37, to the circuit of the glow tube 65, causing said tube to glow, and thus indicating the presence of the flaw to the operator. The defective tubes can thus be quickly segregated from sound tubes, and thereupon subjected to more thorough testing with recording to determine the severity and exact location of the defects.

Since the present system has a sensitivity such that even extremely small defects, which may be present even in an otherwise serviceable tube, tend to be indicated by flashes of the neon tube, it is desirable to use in such case the variable resistance 69, whereby the response of the tube 65 is set at a limiting lower level, and the tube is permitted to flash only when the unbalance of the bridge reaches a predetermined minimum value.

In some cases it may be desired to operate the indicating and the recording circuits at the same time. This may be achieved by disconnecting the member 73 from the switch 71, whereby the indicating circuit of the tube 65 may be closed without locking the recording circuit and the two circuits operated simultaneously.

I claim as my invention:

1. A system for magnetically testing an elongated metallic member comprising two co-axial coils longitudinally spaced in fixed relationship with each other and adapted to be moved along said metallic member adjacent thereto, a compound measuring bridge circuit comprising a main and an auxiliary bridge, means for supplying an alternating current to said bridge circuit, each of said two coils being connected to form an arm of said main bridge, resistance means connected to form the other two arms of said main bridge, first and second impedance means connected across an intermediate portion of said resistance means to form two arms of the auxiliary bridge, said intermediate portion of said resistance means forming the two other arms of said auxiliary bridge, variable means for adjusting said impedance means to balance said bridge circuit, means for amplifying the unbalance voltage appearing between a point in said main bridge intermediate said two coils and a point in said auxiliary bridge intermediate said first and second impedance means when said coils are moved into the proximity of a variation in the cross-section of said metallic member, means responsive to said amplified unbalance voltage for readjusting said impedance means to rebalance said bridge circuit, and means synchronized with said rebalancing means for recording the unbalance of the measuring bridge circuit.

2. A system for magnetically testing an elongated metallic member, comprising a measuring bridge circuit, means for supplying an alternating current to said bridge circuit, two co-axial coils longitudinally spaced in fixed relationship with each other and adapted to be moved along said metallic member adjacent thereto, each of said coils being connected to said bridge circuit to form an arm thereof, adjustable impedance means connected in the other two arms of the bridge circuit for balancing said bridge circuit, means for amplifying the unbalance voltage appearing across said bridge circuit when said coils are moved into the proximity of a variation in the cross-section of said metallic member, means energized by said amplified voltage for readjusting said impedance means to rebalance said measuring bridge circuit, means synchronized with said rebalancing means for recording the unbalance of the measuring bridge circuit, means for locking said rebalancing means in an inoperative position, an indicating circuit comprising a flash tube connected to said amplifying means, and switch means operable upon the locking of the rebalancing means to close said circuit, whereby the unbalance of the measuring bridge circuit is indicated by the flashing of the tube in said indicating circuit.

3. A system for magnetically testing an elongated metallic member, comprising a measuring bridge circuit, means for supplying an alternating current to said bridge circuit, two co-axial coils longitudinally spaced in fixed relationship with each other and adapted to be moved along said metallic member adjacent thereto, each of said coils being connected to said bridge circuit to form an arm thereof, adjustable impedance means connected in the other two arms of the bridge circuit for balancing said bridge circuit, means for amplifying the unbalance voltage appearing across said bridge circuit when said coils are moved into the proximity of a variation in the cross-section of said metallic member, means energized by said amplified voltage for readjusting said impedance means to rebalance said measuring bridge circuit, means synchronized with said rebalancing means for recording the unbalance of the measuring bridge circuit, means for locking said rebalancing means in an inoperative position, an indicating circuit comprising a flash tube connected to said amplifying means, variable resistance means for selectively adjusting the voltage applied across said tube, and switch means operable upon the locking of the rebalancing means to close said circuit, whereby the unbalance of the measuring bridge circuit is indicated by the flashing of the tube in said indicating circuit.

4. A system for magnetically testing an elongated metallic member, comprising two co-axial coils longitudinally spaced in fixed relationship with each other and adapted to be moved along said metallic member adjacent thereto, a compound measuring bridge circuit comprising a main and an auxiliary bridge, means for supplying an alternating current to said bridge circuit, each of said two coils being connected to form an arm of said main bridge, said main bridge being grounded at a point intermediate said two coils, resistance means connected to form the other two arms of said main bridge, first and second impedance means connected across an intermediate portion of said resistance means to form two arms of the auxiliary bridge, said intermediate portion of said resistance means forming the two other arms of said auxiliary bridge, variable means for adjusting said impedance means to balance said bridge circuit, means for amplifying the unbalance voltage appearing between the grounded point in said main bridge intermediate said two coils and a point in said auxiliary bridge intermediate said first and second impedance means when said coils are moved into the proximity of a variation in the cross-section of said metallic member, means responsive to said amplified unbalance voltage for readjusting said impedance means to rebalance said bridge circuit, and means synchronized with said rebalancing means for recording the unbalance of the measuring bridge circuit.

5. A system for magnetically testing an elongated metallic member, comprising two co-axial coils longitudinally spaced in fixed relationship with each other and adapted to be moved along said metallic member adjacent thereto, a compound measuring circuit comprising a main bridge and an auxiliary bridge network, means for supplying an alternating current to said measuring circuit, each of said two coils being connected to form an arm of said main bridge, said main bridge being grounded at a point intermediate said two coils, resistance means connected to form the other two arms of said main bridge, an auxiliary bridge network comprising first and second impedance means forming parallel branches in said auxiliary bridge network connected to an intermediate portion of said resistance means of the main bridge, means for amplifying the unbalance voltage appearing between the grounded point in said main bridge intermediate said two coils and a point in said auxiliary network intermediate said first and second impedance means when said coils are moved into the proximity of a variation in the cross-section of said metallic member, means responsive to said amplified unbalance voltage for readjusting said impedance means to rebalance said measuring circuit, and means synchronized with said rebalancing means for recording the unbalance of the measuring circuit.

6. A system for magntically testing an elongated metallic member, comprising two co-axial coils longitudinally spaced in fixed relationship with each other and adapted to be moved along said metallic member adjacent thereto, a compound measuring circuit comprising a main bridge and an auxiliary bridge network, means for supplying an alternating current to said measuring circuit, each of said two coils being connected to form an arm of said main bridge, said main bridge being grounded at a point intermediate said two coils, resistance means connected to form the other two arms of said main bridge, an auxiliary bridge network comprising first and second impedance means forming two parallel branches in said auxiliary bridge network connected to an intermediate portion of said resistance means of the main bridge symmetrically with regard to the grounded point in said main bridge intermediate said two coils, means for amplifying the unbalance voltage appearing between the grounded point in said main bridge intermediate said two coils and a point in said auxiliary network intermediate said first and second impedance means when said coils are moved into the proximity of a variation in the cross-section of said metallic member, means responsive to said amplified unbalance voltage for readjusting said impedance means to rebalance said measuring circuit, and means synchronized with said rebalancing means for recording the unbalance of the measuring circuit.

MARION V. LONG.

REFERENCES CITED

The following references are of record in the file of this patent:

UNITED STATES PATENTS

| Number | Name | Date |
|---|---|---|
| 1,910,418 | Zuschlag | May 23, 1933 |
| 1,960,350 | Shackleton et al. | May 29, 1934 |
| 1,992,100 | Stein | Feb. 19, 1935 |
| 2,038,046 | Jakosky | Apr. 21, 1936 |
| 2,067,804 | Thorne | Jan. 12, 1937 |
| 2,104,646 | Greenslade | Jan. 4, 1938 |
| 2,359,894 | Brown et al. | Oct. 10, 1944 |
| 2,365,706 | Keinath | Dec. 16, 1944 |

FOREIGN PATENTS

| Number | Country | Date |
|---|---|---|
| 541,942 | Great Britain | Dec. 18, 1941 |